(12) United States Patent
Kwiatkowski et al.

(10) Patent No.: US 8,983,907 B2
(45) Date of Patent: Mar. 17, 2015

(54) CHANGE NOTIFICATIONS FROM AN UPDATED DATA REPRESENTATION

(75) Inventors: Paul J. Kwiatkowski, Redmond, WA (US); Shawn A. Van Ness, Renton, WA (US); Nicolas Brun, Seattle, WA (US); Michael A. Nelte, Redmond, WA (US); Arpit S. Shah, Bellevue, WA (US); Paul A. Gusmorino, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 440 days.

(21) Appl. No.: 12/962,660

(22) Filed: Dec. 8, 2010

(65) Prior Publication Data

US 2012/0150885 A1 Jun. 14, 2012

(51) Int. Cl.
*G06F 7/02* (2006.01)
*G06F 17/30* (2006.01)
*H04L 29/08* (2006.01)

(52) U.S. Cl.
CPC ...... *H04L 67/1095* (2013.01); *G06F 17/30174* (2013.01); *G06F 17/30345* (2013.01)
USPC ............ 707/625; 707/624; 707/638; 707/758

(58) Field of Classification Search
CPC .................. G06F 17/30065; G06F 17/30068; G06F 17/30345; G06F 17/30; G06F 17/30174
USPC ............ 707/999.102, 999.107, 999.201, 624, 707/625, 703, 758, 999.203, 638
See application file for complete search history.

(56) References Cited

U.S. PATENT DOCUMENTS

| 5,864,850 A | 1/1999 | Nordman |
| 6,260,125 B1 | 7/2001 | McDowell |
| 7,200,666 B1 | 4/2007 | Nguyen |
| 7,480,654 B2 | 1/2009 | Jujjuri et al. |

(Continued)

FOREIGN PATENT DOCUMENTS

| CN | 101848244 A | 9/2010 |
| CN | 101901152 A | 12/2010 |
| JP | 2002259189 A | 9/2002 |

OTHER PUBLICATIONS

Gast, Holger, "Managing Proof Documents for Asynchronous Processing", Retrieved at <<http://www-pu.informatik.uni-tuebingen. de/users/gast/files/asyncdoc.pdf>>, Sep. 29, 2008, pp. 15.

(Continued)

*Primary Examiner* — Bruce Moser
(74) *Attorney, Agent, or Firm* — Jim Banowsky; Kate Drakos; Micky Minhas (57) ABSTRACT

An original representation of an original set of data in a data source can be provided, and an updated representation of an updated set of data in the data source can be received. A change notification set that includes change notifications can be generated by comparing the updated representation with the original representation. The change notification set can represent a possible set of changes that yield the updated representation when starting with the original representation. The change notification set can be sent to a client of the data source. One or more requests from the client for data from the data source may be processed while obtaining the updated representation of the updated set of data. This processing can include adding one or more placeholders and matching the placeholder(s) with one or more items in the updated set of data.

20 Claims, 6 Drawing Sheets

(56) References Cited

U.S. PATENT DOCUMENTS

| | | | |
|---|---|---|---|
| 7,725,456 | B2 | 5/2010 | Augustine |
| 7,761,522 | B2 | 7/2010 | Shenfield et al. |
| 7,890,464 | B2* | 2/2011 | Reinsch ............... 707/638 |
| 2001/0049635 | A1 | 12/2001 | Chung |
| 2003/0120710 | A1 | 6/2003 | Pulsipher et al. |
| 2003/0131051 | A1 | 7/2003 | Lection et al. |
| 2003/0131073 | A1 | 7/2003 | Lucovsky et al. |
| 2003/0220984 | A1 | 11/2003 | Jones et al. |
| 2004/0172423 | A1* | 9/2004 | Kaasten et al. .......... 707/201 |
| 2004/0205692 | A1 | 10/2004 | Robinson |
| 2004/0230903 | A1 | 11/2004 | Elza et al. |
| 2004/0267836 | A1* | 12/2004 | Armangau et al. ....... 707/203 |
| 2005/0021572 | A1* | 1/2005 | Ren et al. ................ 707/203 |
| 2005/0038791 | A1* | 2/2005 | Ven ......................... 707/100 |
| 2005/0055354 | A1 | 3/2005 | Thompson et al. |
| 2005/0154847 | A1 | 7/2005 | Trembecki |
| 2005/0216441 | A1 | 9/2005 | Thomas et al. |
| 2005/0234997 | A1* | 10/2005 | Gu et al. ................ 707/104.1 |
| 2006/0064634 | A1 | 3/2006 | Dettinger et al. |
| 2006/0101082 | A1 | 5/2006 | Agrawal et al. |
| 2006/0106888 | A1* | 5/2006 | Iida et al. ................ 707/203 |
| 2007/0198602 | A1* | 8/2007 | Ngo et al. ................ 707/201 |
| 2007/0208786 | A1* | 9/2007 | Kim ........................ 707/203 |
| 2007/0288531 | A1* | 12/2007 | Motta ...................... 707/203 |
| 2008/0016151 | A1* | 1/2008 | Howard et al. .......... 709/203 |
| 2008/0134211 | A1 | 6/2008 | Cui |
| 2008/0140587 | A1 | 6/2008 | Corning et al. |
| 2008/0270486 | A1* | 10/2008 | Hind et al. ............... 707/201 |
| 2009/0132956 | A1 | 5/2009 | Mahasintunan |
| 2009/0164921 | A1 | 6/2009 | Wagner et al. |
| 2009/0259695 | A1* | 10/2009 | Gupta et al. ............. 707/200 |
| 2009/0279143 | A1 | 11/2009 | St. Jacques, Jr. et al. |
| 2009/0327403 | A1 | 12/2009 | Bhat et al. |
| 2010/0153339 | A1* | 6/2010 | Wang ...................... 707/638 |
| 2010/0229052 | A1 | 9/2010 | Cuneo et al. |
| 2011/0055155 | A1* | 3/2011 | Page et al. ............... 707/625 |
| 2012/0054158 | A1* | 3/2012 | Hu et al. .................. 707/692 |

OTHER PUBLICATIONS

Seidenberg, et al., "A Methodology for Asynchronous MultiUser Editing of Semantic Web Ontologies", Retrieved at <<http://www.deltaflow.com/wp-content/pdf/kcapfp10-seidenberg.pdf>>, Oct. 28-31, 2007, pp. 8.

Ignat, et al., "Operation-Based Versus State-Based Merging in Asynchronous Graphical Collaborative Editing", Retrieved at <<http://www.loria.fr/~ignatcla/pmwiki/pub/papers/IgnatCEW04.pdf>>, Retrieved Date: Jan. 24, 2011, pp. 8.

Kwiatkowski, et al., "Placeholders Returned for Data Representation Items", U.S. Appl. No. 12/962,662, filed Dec. 8, 2010, pp. 44.

Kwiatkowski, et al., "Data Items Manager", U.S. Appl. No. 13/010,779, filed Jan. 21, 2011, pp. 60.

Kwiatkowski, et al., "Optimistic Application of Data Edits", U.S. Appl. No. 13/111,951, filed May 20, 2011, pp. 48.

"Conventions for Bound Properties", Retrieved at << http://opensource.adobe.com/wiki/display/flexsdk/Conventions+for+Bound+Properties >>, Feb. 5, 2009, pp. 5.

"Flexible and Powerful Data Binding with WPF", Retrieved at << http://www.devx.com/codemag/Article/40316/1763/page/3 >>, Retrieved Date : Oct. 5, 2010, pp. 3.

Chawathe, et al., "Representing and Querying Changes in Semistructured Data", Retrieved at << http://ieeexplore.ieee.org/stamp/stamp.jsp?tp=&arnumber=655752 >>, Feb. 27, 1998, pp. 10.

"Data Replication for Backup Best Practices", Retrieved at << http://searchdatabackup.techtarget.com/generic/0,295582,sid187_gci1349280,00.html >>, Mar. 2, 2009, pp. 3.

Hsiao, et al., "Tornado: A Capability-Aware Peer-to-Peer Storage Network", Retrieved at << http://urania.cs.ntou.edu.tw/~william/20071220/Tapestry/01213171.pdf >>, Proceedings of the International Parellel and Distributed Processing Symposium, Apr. 26, 2003, pp. 8.

Jansen, et al., "Data Locality in Parallel Rendering", Retrieved at << http://graphics.tudelft.nl/~fwj/PGV98.pdf >>, 1998, pp. 15.

"Data Binding Overview", Retrieved at << http://msdn.microsoft.com/en-us/library/ms752347.aspx >>, Retrieved Date: Oct. 5, 2010, pp. 13.

Preguica, et al., "Integrating Synchronous and Asynchronous Interactions in Groupware Applications", Retrieved at <<http://citeseerx.ist.psu.edu/viewdoc/download?doi=10.1.1.64.6145&rep=rep1&type=pdf >>, Proceedings of CRIWG, Sep. 2005, pp. 16.

Tretola, et al., "Extending Web Services Semantics to Support Asynchronous Invocations and Continuation", Retrieved at << http://ieeexplore.ieee.org/stamp/stamp.jsp?tp=&arnumber=4279601>>, IEEE International Conference on Web Services, Jul. 9, 2007, pp. 8.

"Configuring High Availability for Oracle Fusion Middleware SOA Suite", Retrieved at << http://download.oracle.com/docs/cd/E16764_01/core.1111/e10106/ha_soa.htm >>, Retrieved Date: Oct. 7, 2010, pp. 123.

Costa, et al., "TeenyLIME: Transiently Shared Tuple Space Middleware for Wireless Sensor Networks", Retrieved at << http://www.sics.se/~luca/papers/costa06teenylime.pdf >>, Proceedings of the international workshop on Middleware for sensor networks, 7th International Middleware Conference, Nov. 27-Dec. 1, 2006, pp. 6.

"MIRO Announces GOLD™ Version 2005", Retrieved at << http://www.mirotechnologies.com/news-and-events-detail.php?sec=6&sub=34&sub1=161 >>, Dec. 21, 2004, pp. 4.

"International Search Report", Mailed Date: Jul. 18, 2012, Application No. PCT/US2011/063209, Filed Date: Dec. 4, 2011, pp. 9.

Office Action, U.S. Appl. No. 13/010,779, filed Jan. 21, 2011, Mailing Date: Nov. 15, 2012, pp. 24.

Office Action, U.S. Appl. No. 12/962,662, filed Dec. 8, 2010, Notification Date: Mar. 14, 2013, pp. 32.

Office Action, U.S. Appl. No. 13/010,779, filed Jan. 21, 2011, Notification Date: Apr. 26, 2013, pp. 27.

Office Action, U.S. Appl. No. 13/111,951, filed May 20, 2011, Notification Date: Apr. 15, 2013, pp. 32.

Office Action, U.S. Appl. No. 13/111,951, filed May 20, 2011, Notification Date: Sep. 27, 2013, pp. 20.

Limbic~Region, "Patience Sorting to Find Longest Increasing Subsequence", on May 3, 2006, Last Comment Dated Oct. 7, 2009, 11 Pages.

"Search Report", Date: Dec. 25, 2013, China Patent Application No. 201210018558.3, Filing Date Jan. 20, 2012, 2 Pages.

Office Action, U.S. Appl. No. 13/010,779, filed Jan. 21, 2011, Notification Date: Mar. 4, 2014, pp. 34.

Office Action, U.S. Appl. No. 13/111,951, filed May 20, 2011, Notification Date: Mar. 14, 2014, pp. 39.

Office Action, U.S. Appl. No. 13/010,779, filed Jan. 21, 2011, Notification Date: Oct. 21, 2014, 25 Pages.

Office Action, U.S. Appl. No. 13/010,779, filed Jan. 21, 2011, Notification Date: Jun. 17, 2014, 24 Pages.

Office Action Summary Form and Search Report Translations, Chinese Patent Application No. 201110405568.8, Date of Office Action Issue: Jan. 24, 2014, 5 Pages.

* cited by examiner

CHANGE NOTIFICATIONS FROM AN UPDATED DATA REPRESENTATION

BACKGROUND

Some applications can receive and use notifications of changes that have occurred to data at a data source, and some data sources are able to provide synchronous change notifications for such uses. For example, an application may display a list of items from a given data source, and update that display as the underlying data changes. The application may use the synchronous changes to display animations to clearly convey to the user what has changed, rather than simply refreshing the entire display.

SUMMARY

With many data sources, particularly remote data sources such as those accessed remotely over a global computer network, synchronous change information is not readily available, and all of the visible data is fetched again when a change has occurred. The tools and techniques described herein can generate a set of change notifications when data representations are updated.

In one embodiment, the tools and techniques can include providing an original representation of an original set of data in a data source. An updated representation of an updated set of data in the data source can be received. A change notification set that includes change notifications can be generated by comparing the updated representation with the original representation. The change notification set can represent a possible set of changes that yield the updated representation when starting with the original representation. The change notification set can be sent to a client of the data source.

In another embodiment of the tools and techniques, an original representation of an original set of data in a data source can be provided to a client of the date source. An update to the original set of data in the data source can be detected. In response to the update being detected, an updated representation of the updated set of data in the data source can be fetched. A change notification set that includes change notifications can be generated by comparing the updated representation with the original representation. The change notification set can represent a possible set of changes that yield the updated representation when starting with the original representation. The possible set of changes can include fewer changes than an alternative set of changes that would represent deletion of all items in the original set of data and insertion of all items in the updated set of data. The change notification set can be sent to the client.

This Summary is provided to introduce a selection of concepts in a simplified form. The concepts are further described below in the Detailed Description. This Summary is not intended to identify key features or essential features of the claimed subject matter, nor is it intended to be used to limit the scope of the claimed subject matter. Similarly, the invention is not limited to implementations that address the particular techniques, tools, environments, disadvantages, or advantages discussed in the Background, the Detailed Description, or the attached drawings.

DETAILED DESCRIPTION

Embodiments described herein are directed to techniques and tools for improved communication of data changes to a client of a data source. Such improvements may result from the use of various techniques and tools separately or in combination.

Such techniques and tools may include providing a component that presents to a client an interface that behaves as if a data source provides synchronous change notifications, whether or not the data source actually does. When a data change is detected or a refresh is requested, this component can communicate with the data source to determine the current state of the data. If the state of the data has changed since the component received a previous (i.e., original) representation of the data, then the component can generate change notifications by comparing the original representation of an original state of the data with an updated representation of the current and updated state of the data. The change notifications can represent changes that could be made to produce the updated representation from the original representation. If the client continues to request information while this refresh is in progress, the component can return placeholders in lieu of the actual data representation items, and can attempt to match the placeholders to representations of actual data items once the current state of the data is known. The change notifications can be forwarded to the client, and the client may use the notifications. For example, the client may use the notifications to provide animations illustrating the data changes represented by the notifications.

The subject matter defined in the appended claims is not necessarily limited to the benefits described herein. A particular implementation of the invention may provide all, some, or none of the benefits described herein. Although operations for the various techniques are described herein in a particular, sequential order for the sake of presentation, it should be understood that this manner of description encompasses rearrangements in the order of operations, unless a particular ordering is required. For example, operations described sequentially may in some cases be rearranged or performed concurrently. Techniques described herein with reference to flowcharts may be used with one or more of the systems described herein and/or with one or more other systems. For example, the various procedures described herein may be implemented with hardware or software, or a combination of both. Moreover, for the sake of simplicity, flowcharts may not show the various ways in which particular techniques can be used in conjunction with other techniques.

I. Exemplary Computing Environment

Figure 1:
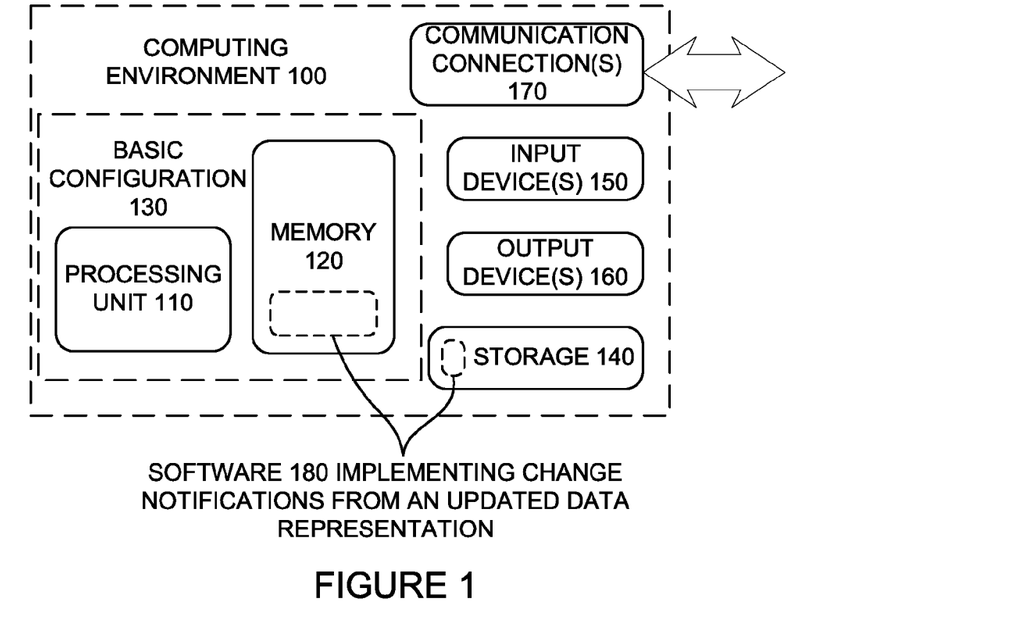
FIG. 1 is a block diagram of a suitable computing environment in which one or more of the described embodiments may be implemented.

FIG. 1 illustrates a generalized example of a suitable computing environment (100) in which one or more of the described embodiments may be implemented. For example, one or more such computing environments can be used as a data source, as a client computing environment, and/or as a computing environment for an items manager component. Generally, various different general purpose or special purpose computing system configurations can be used. Examples of well-known computing system configurations that may be suitable for use with the tools and techniques described herein include, but are not limited to, server farms and server clusters, personal computers, server computers, hand-held or laptop devices, multiprocessor systems, microprocessor-based systems, programmable consumer electronics, network PCs, minicomputers, mainframe computers, distributed computing environments that include any of the above systems or devices, and the like.

The computing environment (100) is not intended to suggest any limitation as to scope of use or functionality of the invention, as the present invention may be implemented in diverse general-purpose or special-purpose computing environments.

With reference to FIG. 1, the computing environment (100) includes at least one processing unit (110) and memory (120). In FIG. 1, this most basic configuration (130) is included within a dashed line. The processing unit (110) executes computer-executable instructions and may be a real or a virtual processor. In a multi-processing system, multiple processing units execute computer-executable instructions to increase processing power. The memory (120) may be volatile memory (e.g., registers, cache, RAM), non-volatile memory (e.g., ROM, EEPROM, flash memory), or some combination of the two. The memory (120) stores software (180) implementing change notifications from an updated data representation. However, change notifications from an updated data representation may be implemented at least partially in hardware.

Although the various blocks of FIG. 1 are shown with lines for the sake of clarity, in reality, delineating various components is not so clear and, metaphorically, the lines of FIG. 1 and the other figures discussed below would more accurately be grey and blurred. For example, one may consider a presentation component such as a display device to be an I/O component. Also, processors have memory. The inventors hereof recognize that such is the nature of the art and reiterate that the diagram of FIG. 1 is merely illustrative of an exemplary computing device that can be used in connection with one or more embodiments of the present invention. Distinction is not made between such categories as "workstation," "server," "laptop," "handheld device," etc., as all are contemplated within the scope of FIG. 1 and reference to "computer," "computing environment," or "computing device."

A computing environment (100) may have additional features. In FIG. 1, the computing environment (100) includes storage (140), one or more input devices (150), one or more output devices (160), and one or more communication connections (170). An interconnection mechanism (not shown) such as a bus, controller, or network interconnects the components of the computing environment (100). Typically, operating system software (not shown) provides an operating environment for other software executing in the computing environment (100), and coordinates activities of the components of the computing environment (100).

The storage (140) may be removable or non-removable, and may include computer-readable storage media such as magnetic disks, magnetic tapes or cassettes, CD-ROMs, CD-RWs, DVDs, or any other medium which can be used to store information and which can be accessed within the computing environment (100). The storage (140) stores instructions for the software (180).

The input device(s) (150) may be a touch input device such as a keyboard, mouse, pen, or trackball; a voice input device; a scanning device; a network adapter; a CD/DVD reader; or another device that provides input to the computing environment (100). The output device(s) (160) may be a display, printer, speaker, CD/DVD-writer, network adapter, or another device that provides output from the computing environment (100).

The communication connection(s) (170) enable communication over a communication medium to another computing entity. Thus, the computing environment (100) may operate in a networked environment using logical connections to one or more remote computing devices, such as a personal computer, a server, a router, a network PC, a peer device or another common network node. The communication medium conveys information such as data or computer-executable instructions or requests in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

The tools and techniques can be described in the general context of computer-readable storage media. Computer-readable storage media are any available storage media that can be accessed within a computing environment, but the term computer-readable storage media does not refer to signals per se. By way of example, and not limitation, with the computing environment (100), computer-readable storage media include memory (120), storage (140), and combinations of the above.

The tools and techniques can be described in the general context of computer-executable instructions, such as those included in program modules, being executed in a computing environment on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing environment. In a distributed computing environment, program modules may be located in both local and remote computer storage media.

For the sake of presentation, the detailed description uses terms like "determine," "choose," "adjust," and "operate" to describe computer operations in a computing environment. These and other similar terms are high-level abstractions for operations performed by a computer, and should not be confused with acts performed by a human being, unless performance of an act by a human being (such as a "user") is explicitly noted. The actual computer operations corresponding to these terms vary depending on the implementation.

Figure 2:
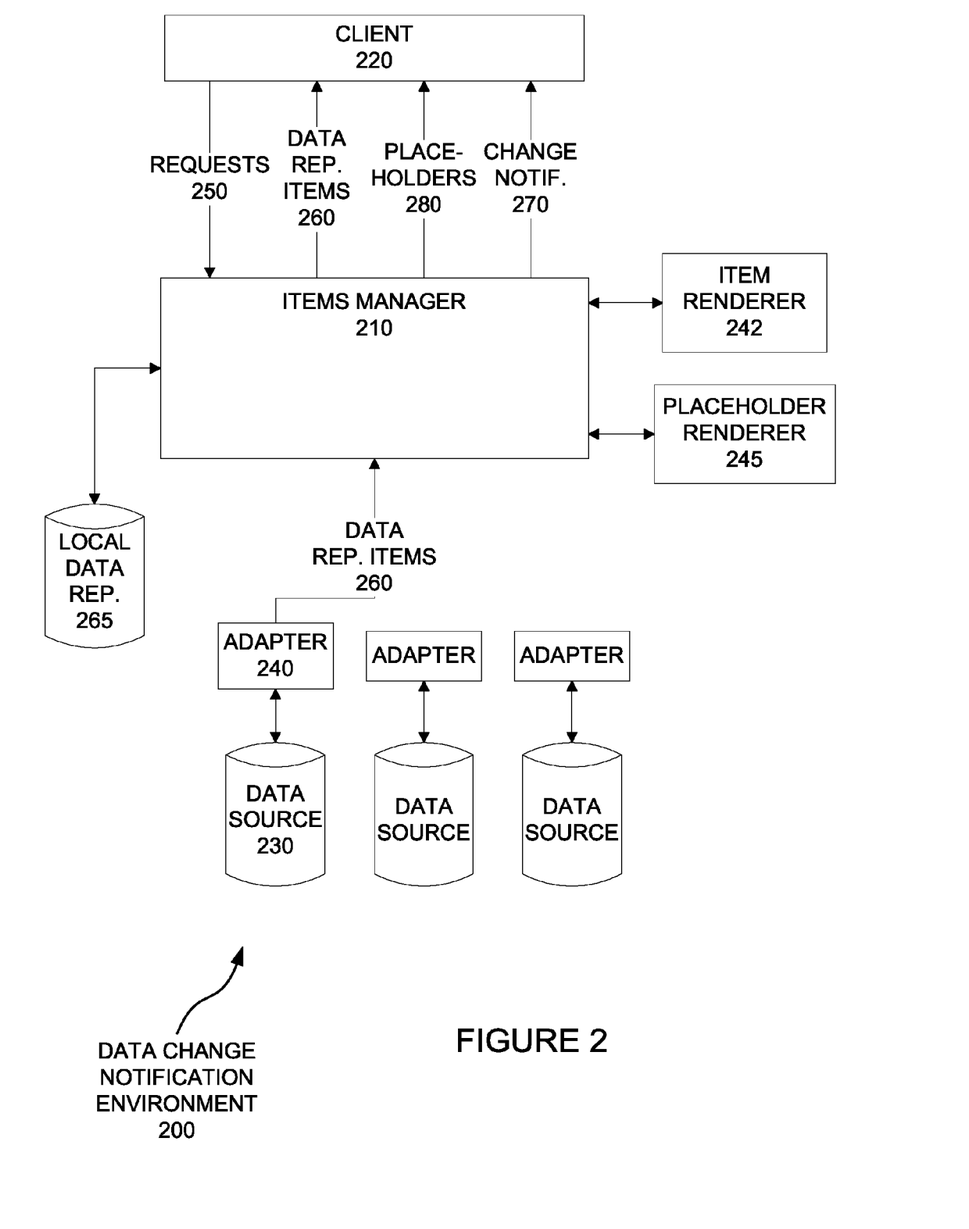
FIG. 2 is a schematic diagram of a data change notification environment.

II. System and Environment for Change Notification from an Updated Data Representation A. Implementation of an Items Manager and an Overall System and Environment FIG. 2 is a schematic diagram of a data change notification environment (200) in conjunction with which one or more of the described embodiments may be implemented. The data change notification environment (200) can include an items manager (210), which can be a software component. The items manager (210) can communicate with a client (220), and with a data source (230), which can be one of various different types of data sources (illustrated by the other data sources in FIG. 2). The items manager (210) may also communicate with one or more other clients and/or one or more other data sources. The items manager (210) may communicate with the data source (230) through an adapter (240), which can be configured for a particular type of data source. The items manager (210) may also communicate with an item renderer (242) and a placeholder renderer (245) if the items manager (210) is to send rendered versions of data representation items to the client (220). The various components shown in FIG. 2 may be in a single computing environment such as the computing environment (100) discussed above, or they may be spread across multiple computing environments in one of various different configurations.

The items manager (210) can receive one or more requests (250) from the client (220) for representation item(s) representing one or more items from the data source (230). In response, the items manager (210) can fetch the data representation items (260) from the data source (230) through the adapter (240) or from a local data representation (265) (if the requested data representation items have already been fetched from the data source (230)). For example, the items manager (210) can send one or more requests to the data source (230), and the data source (230) can return data representation items (260) to the items manager (210) through the adapter (240). The data representation items (260) may change form as they are sent from the data source (230) to the client (220). As just one example, the adapter (240) may convert the data representation items (260) to an array of ECMAScript objects and forward those objects to the items manager (210). The items manager (210) may send the ECMAScript objects to the item renderer (242), and the item renderer may return the data representation items (260) to the items manager as HTML Document Object Model elements, and the items manager (210) may forward those HTML Document Object Model elements to the client (220). The data representation items (260) may take any of various other forms. For example, the items manager (210) may send un-rendered versions of the data representation items (260) to the client (220), and the client (220) may use the data representation items (260) for uses other than display.

The items manager (210) may maintain the local data representation (265) that represents a subset of a larger data set maintained by the data source (230). For example, the local data representation (265) may only include data representation items (260) for items that are currently displayed in a list (which could be displayed in various forms, such as in a vertically-extending list, in a grid, as thumbnails, etc.) by the client (220) and possibly some related data representation items (260). For example, the local data representation (265) may also include data representation items (260) for neighbors of items that are currently displayed, items that have recently been displayed, etc. However, the items manager (210) may virtualize the local data representation (265) to make it seem to the client (220) as though the items manager (210) has downloaded the entire data set from the data source (230). For example, the items manager (210) may fetch and provide the client (220) with information on a total number of items in the data set of the data source (230) so that the client (220) can take appropriate actions, such as sizing and locating a scroll bar appropriately for the overall data set of the data source (230).

If the client (220) sends the items manager (210) a request (250) for an item representation that the items manager (210) has not yet retrieved from the data source (230), the items manager (210) can return to the client (220) a placeholder (280) until the items manager (210) successfully fetches the representation item (260) from the data source (230). The items manager (210) may also include the placeholder (280) in the local data representation (265), where the placeholder (280) can be used for recordkeeping purposes, such as to be matched with a corresponding data representation item (260) when the data representation item (260) is returned from the data source (230). Additionally, the client (220) may use the placeholder for various purposes such as recordkeeping and for displaying in lieu of the actual data representation item (260) until the data representation item (260) is returned.

A placeholder (280) can take any of various forms. For example, the placeholder(s) and the actual data representation items (260) in the local data representation (265) may be in the form of rendered HTML Document Object Model elements formed by the placeholder renderer (245) in response to requests from the items manager (210). Alternatively, the placeholders (280) may take some other form, such as the form of opaque handles, or some other data type. Additionally, the placeholders (280) in the local data representation (265) may be in a different form from the placeholders (280) returned to the client (220) in response to requests (250) from the client (220).

B. Change Notifications from an Updated Data Representation

The items manager (210) can present to the client (220) an interface that behaves as if the data source (230) provides synchronous change notifications, whether or not the data source (230) actually does so. This may be done in three main steps to be performed by the items manager (210): detecting that the current local data representation (265) is out of date compared the data set in the data source (230), fetching an updated representation in the form of data representation items (260) to replace all or part of the local data representation (265), and comparing the original and updated versions of the updated local data representation (265) to generate the change notifications. Each of these will be discussed below.

1. Detecting Out-of-Date Local Data Representation

Detecting that the local data representation (265) is out of date may be bypassed if a refresh operation (i.e., fetching an updated representation in the form of data representation items (260) to replace all or part of the local data representation (265), and comparing the original and updated versions of the updated local data representation (265) to generate the change notifications) is requested, such as by the client (220). For example, the client (220) may be configured to periodically request a refresh operation, or a refresh operation may be requested by user input. Additionally, the items manager (210) can initiate a refresh operation autonomously, such as when the items manager (210) or the adapter (240) has detected that the local data representation (265) is out of date.

For example, an out-of-date local data representation (265) may be detected when the client requests additional data representation items (260). The items manager (210) may request an overlapping portion of the already-fetched local data representation (265) in addition to requesting the new data representation items (260) requested by the client (220). The items manager can process batches of data representation items (260) when they arrive from the data source (230). Each time a batch arrives, the items manager (210) can compare overlap, if any, with previously-returned data representation items (260) for consistency. For example, if a data representation item K was after an item J before, but now it is after an item H, something has changed, even if the client's most recent request was for item K only. If indices are provided for data representation items (260) in a list, a change in a data representation item's index can also indicate a change to one or more other data representation items (260) in the list.

The items manager (210) may attempt to determine what has changed and fetch a subset of the new data that is determined to have changed. Alternatively, all the data representation items (260) that are in the local data representation (265) (which may be all the data representation items (260) that the client (220) is currently maintain handles to) can be re-fetched by the items manager (210). A discussion of this fetching follows.

2. Fetching Updated Data Representation

When fetching an updated data representation as part of a refresh operation, the items manager (210) can enter a different mode of operation. In this mode, the items manager (210) can ignore data representation items (260) that arrive due to requests that were sent before this mode was entered. Additionally, while in this mode, the items manager (210) may communicate with the data source (230) to fetch batches of data until the items manager (210) has a consistent "snapshot", i.e., a complete updated local data representation (265) of the portion of the data in the data source (230) that corresponds to the original local data representation (265) (i.e., the local data representation already available to the items manager (210)). Various heuristics could be used by the items manager (210) to obtain such a snapshot. In one implementation, which can be used for lists of data representations, attempts to re-obtain an instantiated sub-list in as few requests as possible can be performed, and the items manager (210) can examine each batch of results to see what still needs to be requested. In this approach, a data representation item (260) in the original local data representation (265) may be considered deleted if a request for that specific item fails, but until such a failure occurs or the data representation item (260) is successfully re-fetched, the item can be considered an item that is still to be fetched in the refresh operation.

If the items manager (210) finds a contradiction between batches of received data representation items (260), the fetching process can begin anew and all the data representation items (260) in the local data representation (265) can be requested once again. For example, this may occur if data changes in the data source (230) between times when different batches are sent.

While the items manager (210) is in its refresh mode, it can discontinue requesting new items from the data source (230). However, the items manager (210) can continue to process requests (250) from the client (220) by returning placeholders (280) in response to the requests (250). Alternatively, the items manager (210) may fulfill some client requests if the fulfillment of those requests is accounted for in the process of performing the refresh operation.

3. Compare Representations and Generate Change Notifications

Generating the change notifications (270) may be done in any of various ways. For example, the set of change notifications (270) could represent the deletion of all the data representation items (260) in the original local data representation (265) and the insertion of all the data representation items (260) in the updated local data representation (265). However, such a set of change notifications (270) may not provide the client (220) with enough information to communicate the changes to users in helpful ways.

Alternatively, the items manager (210) can generate a set of change notifications (270) representing a set of changes that is plausible even if the true sequence of changes to the data set in the data source (230) is unknown to the items manager (210). This may be done by the items manager (210) using techniques that can decrease the number of changes represented by the change notifications (270), so that the number of changes is less than if the changes included the deletion of all the data representation items (260) in the original local data representation (265) and the insertion of all the data representation items (260) in the updated local data representation (265). The client (220) can use such a set of change notifications (270) to communicate the changes to users in various ways. For example, the client (220) may provide animations to highlight the changes. Additionally, the client (220) can communicate the changes in other ways. For example, if an item that happened to be displayed at the top of a screen showing a list of data representation items (260) is moved to another part of the data set in the data source (230), the client can leave the visible window scrolled to its original location (and show all the subsequent data representation items (260), rather than scrolling the window just to keep that one item at the top of the screen.

Following is a description of one implementation of a technique that the items manager (210) can use to generate the change notifications (270). Overall, this technique can gradually alter the original local data representation (265) until it matches the updated local data representation (265). This technique will be described with reference to FIG. 3, which illustrates a specific example of a portion of an original local data representation (310), a portion of a received updated data representation (320) that was fetched in a refresh operation, and a resulting portion of an updated local data representation (330) after the list generation technique has been run.

Figure 3:
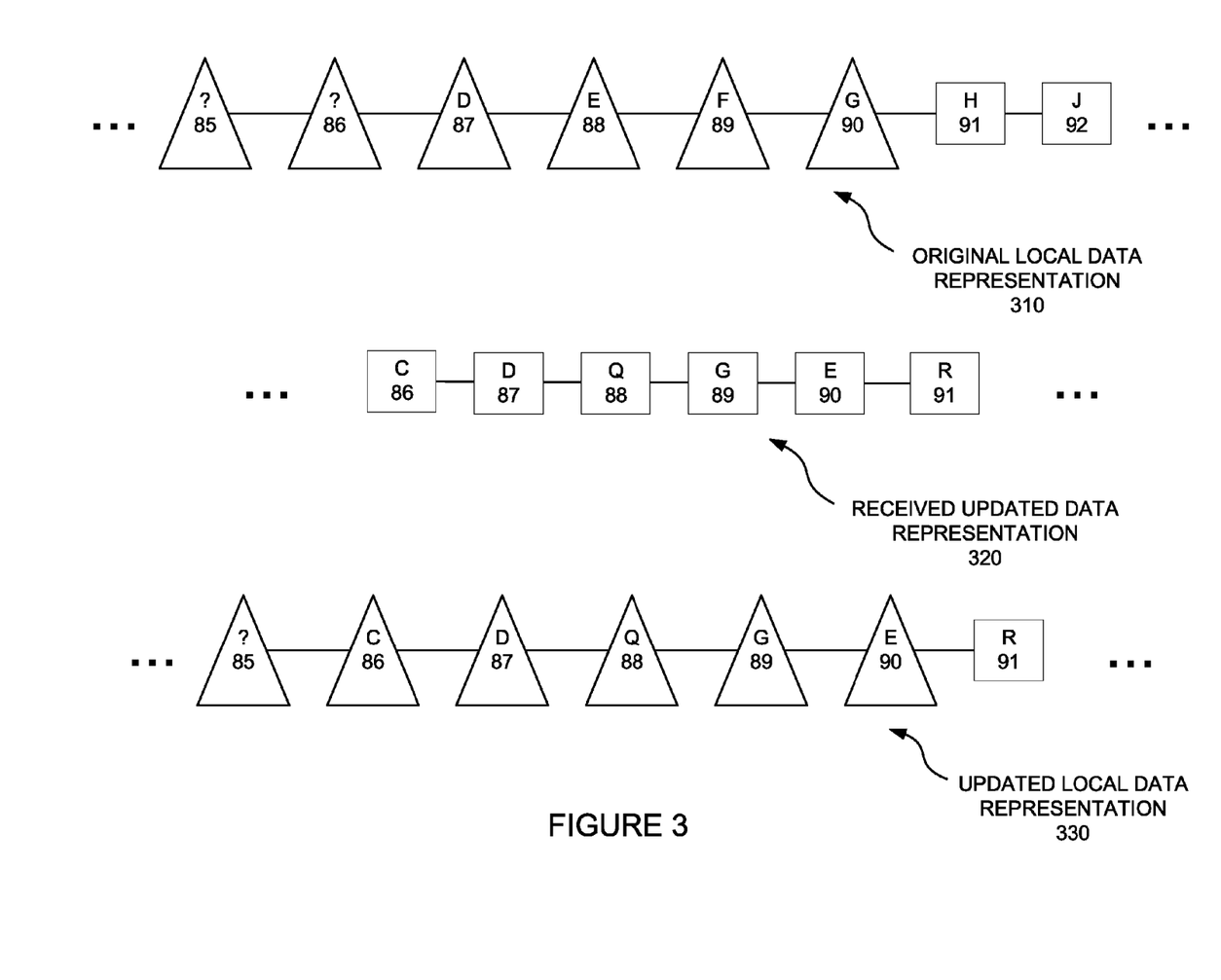
FIG. 3 is a schematic diagram of a portion of an original local data representation, a portion of a received updated data representation, and a portion of an updated local data representation.

In FIG. 3, items are listed in their order in the representation, which may also be in order of the items' indices, as illustrated. In FIG. 3, triangles with question marks illustrate placeholders, triangles with capital letters illustrate data representation items that have been requested by the client and instantiated (e.g., rendered as UI descriptions that are sent to the client), and boxes with letters illustrate data representation items that have been returned from the data source but not requested by the client and not yet instantiated. The numbers below the question marks or capital letters indicate the index numbers for the items in the overall data set in the data source. Additionally, the capital letters can represent keys for the data representation items. Each such key can be a value that does not change for the data item, and that is different from keys for the other data items in the data set in the data source. For example, the keys may be keys made up by the data source for recordkeeping, or they may be identifiers such as driver's license numbers, social security numbers, etc. To the extent such keys represent sensitive information, they can be protected with appropriate security measures such as encryption techniques. The keys can be used by the items manager for record keeping, such as distinguishing and/or matching corresponding data representation items.

The original data representation (310) is illustrated as including two placeholders with indices 85 and 86 (representing items that had been requested by the client but not yet returned by the items manager), followed by instantiated data representation items D, E, F, and G with respective indices 87, 88, 89, and 90, and then followed by unrequested data items H and J, with respective indices 91 and 92. The received updated data representation (320) includes items C, D, Q, G, E, and R with respective indices 86, 87, 88, 89, 90, and 91. The received updated data representation (320) can be compared to the original local data representation (310) to generate change notifications to be sent to the client. A technique for generating those change notifications will now be described.

In the technique, items that appear in the original local data representation (310), but not in the received updated data representation (320), can be found. Remove-type change notifications can be sent for such items, and the items can be removed. For example, a remove-type notification for item F can be sent to the client, and item F can be removed from the local data representation. During this operation, access of the client can be limited so that the client is not permitted to observe indices on the items because such indices may be inconsistent. Alternatively, a client may be permitted to see such indices if the indices are changed and the client is informed of the index changes when other changes are made that may affect the indices. As yet another alternative, a client may be allowed to see indices even if the indices are inconsistent.

The technique can further include finding placeholders generated for items requested by index, and matching those placeholders to those items. For example, if the placeholders with indices 85 and 86 in the original local data representation were requested by index, this could include matching the placeholder having an index of 86 in the original local data representation (310) with the item C having the index 86 in the received updated data representation (320). This can be done before moving placeholders in the data representation to prevent placeholders for items requested by index from moving, because such movements of index-requested placeholders could result in a placeholder being matched with an item having an index other than the one requested.

While not illustrated in FIG. 3, the received updated data representation (320) may be spread across multiple non-contiguous ranges. For example, this may occur because the client may be allowed to retain handles to non-contiguous ranges, so the original local data representation (310) may include multiple non-contiguous ranges of representation items requested by the client. Additionally, the items manager may only request a limited range around each item in the original local data representation (310). The technique can include determining a match for each range in the received updated data representation. For example, the match can include a range in the original local data representation (310) that shares the most individual items with the matching range in the received updated data representation (320). In some cases, ranges in the original local data representation (310) may be merged if the merged range maps to a range in the received updated data representation (320).

In the received updated data representation (320), boundaries of each range outside which all items do not appear in the original local data representation (310) can be marked. For example, this can include marking a boundary between items E and R in and between items C and D in the received updated data representation (320). These boundaries can distinguish between items that appear to have simply not been observed yet (e.g., items C and R) and items that have been inserted into the data set in the data source (e.g., item Q).

Of the items that appear in each range of the received updated data representation (320) and its matched range in the original local data representation, a set of items that do not need to be moved relative to one another can be identified and marked as being stationary. This can be done in such a way that the number of such stationary items is increased and accordingly the number of move-type change notifications can be decreased. For example, with a list this can include assigning ordinals to the items in the original local data representation (310) and in the received updated data representation, and then finding the "longest ordered subsequence" of those items. As an example, this can be done using a portion of the known "patience sorting" technique. In the illustrated example of FIG. 3, this can result in identifying D and G as stationary, where D and G form the longest ordered subsequence. (Alternatively, the technique could have identified D and E as stationary with the same size ordered subsequence.)

If there are placeholders inside the marked boundaries discussed above, attempts can be made to match these placeholders to items in the received updated data representation (320) that do not appear in the original local data representation (310), based on neighbors that appear in both data sets. For example, if the placeholder with index 86 had not already been matched with item C because of matching index values, that placeholder could be matched with item C because item C and the placeholder have the same neighbor (item D).

The technique may include sending a move-type change notification for the non-stationary items that are in both the received updated data representation (320) and the original local data representation (310). The moves can be performed in the local data representation. For example, this can include sending a move-type notification for item E and moving item E to be after item G in the local data representation. When generating and sending these notifications, the client's access can be limited. For example, the client may be allowed to observe the neighbors of an item, but not the item's indices.

The technique can further include finding new items that appear in the received updated data representation (320), but not the original local data representation (310). These new items can be added to the local data representation, and corresponding inserted-type change notifications can be sent to the client. For example, in FIG. 3, item Q can be inserted after item D and an inserted-type change notification can be sent to the client. As with moves, the client's access can be limited when performing insertions. For example, the client can be allowed to observe the neighbors of any item, but not indices for items.

Additionally, the technique can include comparing contents of items that appear in both the original local data representation (310) and the updated local data representation (330). For items whose contents have changed, the items can be updated in the local data representation and changed-type change notifications can be sent to the client. Again, the client's access can be limited during this operation, so that anything except indices can be observed by the client.

The technique can further identify items that appear in the original local data representation (310) and the updated local data representation (330) whose indices have changed. For example, in the example of FIG. 3, indices for items E and G can be changed and index changed-type change notifications can be sent to the client. During this operation, the client's access can be limited so that it can observe the old and new index of the changing item, but no other indices.

The technique can also include matching placeholders, which have not yet been matched to an item and are on the periphery of ranges in the original local data representation (310) to items outside the marked boundaries of the received updated data representation (320). Indices of placeholders from the original local data representation (310) can be updated based on the items they are matched to, or their adjacency to other instantiated items or other placeholders. After this is done, limits on the client's access can be removed, and the client can be allowed to access the local data representation in the client's usual manner.

Placeholders that are matched to items in the received updated data representation (320) can be instantiated with the matched items in the local data representation, and "item available" notifications can be sent. Additionally, if the overall count of items in the data set in the data source has changed (per information on the overall count being sent from the data source to the items manager), then a count changed-type change notification can be sent to the client to indicate this change.

In the example of FIG. 3, the operations of the refresh technique discussed above can result in the original local data representation (310) at the top of FIG. 3 being updated to the updated local data representation (330) illustrated at the bottom of FIG. 3, and in appropriate change notifications being sent to the client. Other techniques could be used to do this in other ways that would be logical for the change notifications being sent at the time. For example, the order of the operations in the techniques discussed above could be changed so long as they still resulted in an orderly generation of the change notifications that can be properly processed by the client.

After the refresh operation has completed, the fetching of requested items for which there are still placeholders in the local data representation can resume. Such placeholders may have been present in the original local data representation (310), and/or they may have been inserted due to client requests for data during the refresh technique discussed above. For example, in the example of FIG. 3, this can result in fetching an item corresponding to the placeholder in the updated local data representation (330). Accordingly, items can be fetched properly even if results from requests to the data source initiated prior to the refresh operation are ignored to simplify keeping the local data representation consistent at the end of the refresh technique.

III. Techniques for Change Notifications from an Updated Data Representation

Several techniques for change notifications from an updated data representation will now be discussed. Each of these techniques can be performed in a computing environment. For example, each technique may be performed in a computer system that includes at least one processor and a memory including instructions stored thereon that when executed by the at least one processor cause the at least one processor to perform the technique (a memory stores instructions (e.g., object code), and when the processor(s) execute(s) those instructions, the processor(s) perform(s) the technique). For example, instructions can include the items manager component, which can be executed to perform the techniques. Similarly, one or more computer-readable storage media may have computer-executable instructions embodied thereon that, when executed by at least one processor, cause the at least one processor to perform the technique.

Figure 4:
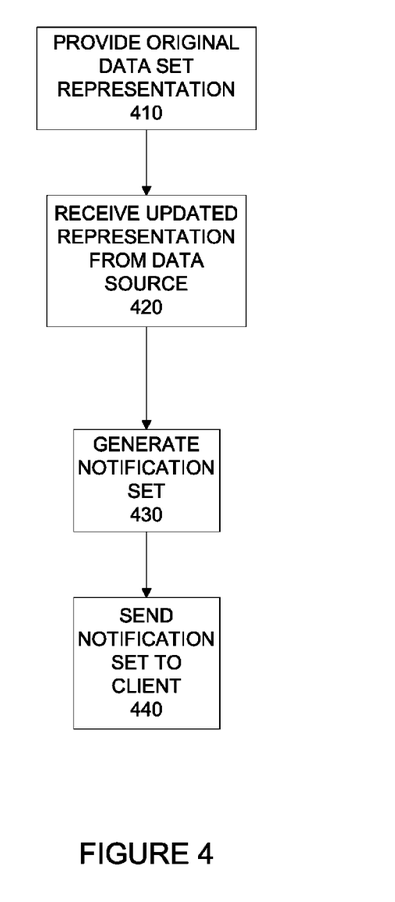
FIG. 4 is a flowchart of a technique for change notifications from an updated data representation.

Referring to FIG. 4, a technique for change notifications from an updated data representation will be described. The technique can include providing (410) an original representation of an original set of data in a data source. The set of data in the data source may be all or only a portion of the data in a data set of the data source. The technique can also include receiving (420) from the data source an updated representation of an updated set of data in the data source. A change notification set that includes change notifications can be generated (430). The change notification set can represent a possible set of changes that yield the updated representation when starting with the original representation. The possible set of changes may include fewer changes than an alternative set of changes that would represent deletion of all items in the old set of data and insertion of all items in the new set of data. Generating (430) the change notification set can include executing a technique to decrease how many move-type change notifications are in the change notification set. This technique may include a patience sorting technique. The change notification set can be sent (440) to a client of the data source.

The technique of FIG. 4 can include limiting access by the client to the updated set of data while generating the change notification set. "While generating the change notification set" and similar phrases such as "while obtaining the updated representation" refer to the time period from when the overall referenced operation (obtaining, generating, etc.) began until the overall referenced operation is complete, though the access need not be limited (or "processing performed" with similar language) for this entire time period. For example, access by the client may be limited to such an extent that the change notification set can be sent to the client in series without the client being able to observe an inconsistent state of data in the data source. However, the technique can include allowing some access by the client to the updated set of data while generating the change notification set. Additionally, one or more requests from the client of the data source for data from the data source based on the original representation can be processed. This processing can be performed while obtaining the updated representation. As an example, the processing may include adding one or more placeholders and it may also include and performing a technique for matching the one or more placeholders with one or more items in the updated set of data.

The original set of data and the updated set of data may be versions of a subset of an overall set of data maintained by the data source. The client may maintain one or more handles to at least a portion of the subset, and the subset can include less than all of the overall set of data maintained by the data source.

Figure 5:
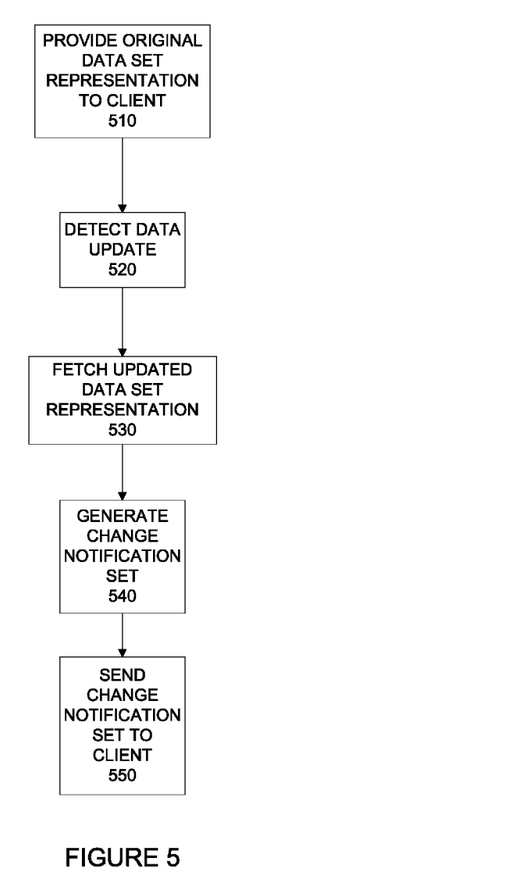
FIG. 5 is a flowchart of another technique for change notifications from an updated data representation.

Referring to FIG. 5, another technique for change notifications from an updated data representation will be described. The technique can include providing (510) to a client of a data source an original representation of an original set of data in the data source. The technique can also include detecting (520) an update to the original set of data in the data source. In response to detecting the update, the technique can include fetching (530) from the data source an updated representation of an updated set of data in the data source. A change notification set that includes change notifications can be generated (540) by comparing the updated representation with the original representation. The change notification set can represent a possible set of changes that yield the updated representation when starting with the original representation. The possible set of changes can include fewer changes than an alternative set of changes that would represent deletion of all items in the original set of data and insertion of all items in the updated set of data. The change notification set can be sent (550) to the client.

The technique of FIG. 5 may also include limiting access by the client to the updated set of data while generating (540) the change notification set. This limitation on access can be done to such an extent that the change notifications in the change notification set are sent to the client in series without allowing the client to observe an inconsistent state of data in the data source. However, the technique may include allowing some access by the client to the updated set of data while generating (540) the change notification set. For example, the technique may include processing one or more requests from a client of the data source. The request(s) can be request(s) for data from the data source. Additionally, the processing of the request(s) can be performed while fetching (530) the updated representation from the data source. The processing can include adding one or more placeholders, and processing may also include a technique for matching the one or more placeholders with one or more items in the updated set of data. Moreover, generating (540) the change notification set can include executing a technique to decrease how many changes are in the possible set of changes. For example, this technique may include identifying stationary items in the original set of data that are not to be identified as moved by the possible set of changes. The stationary items can include a maximum set of ordered items in a range of items in the updated set of data that corresponds to a range of items in the original set of data.

Figure 6:
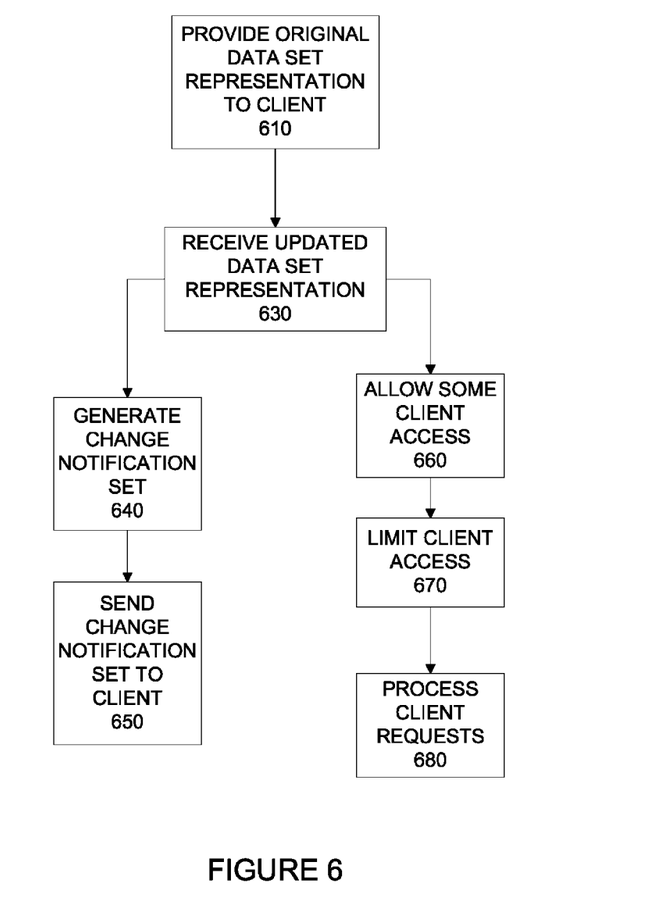
FIG. 6 is a flowchart of yet another technique for change notifications from an updated data representation.

Referring to FIG. 6, yet another technique for change notifications from an updated data representation will be described. The technique can include providing (610) to a client of a data source an original representation of an original set of data in the data source. The technique can also include receiving (630) from the data source an updated representation of an updated set of data in the data source. The original set of data and the updated set of data can be versions of a subset of an overall set of data maintained by the data source. The client can maintain one or more handles to the subset, and the subset can include less than all of the overall set of data maintained by the data source.

The technique of FIG. 6 can also include generating (640) a change notification set including change notifications by comparing the updated representation with the original representation. The change notification set can represent a possible set of changes that yield the updated representation when starting with the original representation. The possible set of changes can include fewer changes than an alternative set of changes that would represent deletion of all items in the original set of data and insertion of all items in the updated set of data. The generation (640) of the change notification set can include identifying one or more stationary items in the original set of data that are not to be identified as moved by the possible set of changes. The stationary item(s) can include a maximum ordered set of one or more items in a range of items in the updated set of data that corresponds to a range of items in the original set of data. The change notification set can be sent (650) to the client.

The client can be allowed (660) some access to the updated set of data while generating (640) the notification set. However, access by the client to the updated set of data can be limited (670) while generating the notification set. The limitation (670) on client access can include limiting access to such an extent that the change notifications in the change notification set can be sent to the client in series without allowing the client to observe an inconsistent state of data in the data source.

The technique of FIG. 6 may also include processing (680) one or more requests from the client for data from the data source. The request(s) can be based on the original representation. The processing (680) can be performed while obtaining the updated set of data. Additionally, the processing (680) can include adding one or more placeholders and performing a technique for matching the one or more placeholders with one or more items in the updated set of data.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

We claim:

1. A computer-implemented method, comprising:
providing an original representation of an original set of data in a data source;
receiving from the data source an updated representation of an updated set of data in the data source;
generating a change notification set comprising change notifications by comparing the updated representation with the original representation, the change notification set representing a possible set of changes that yield the updated representation when starting with the original representation, the change notification set including one or more move-type change notifications, generating the change notification set including executing a technique to decrease how many move-type change notifications are in the change notification set, and the technique to decrease how many move-type change notifications are in the change notification set comprises identifying stationary items in the original set of data that are not to be identified as moved by the possible set of changes, the stationary items comprising a maximum set of ordered items in a range of items in the updated set of data that corresponds to a range of items in the original set of data; and
sending the change notification set to a client of the data source.

2. The method of claim 1, wherein the possible set of changes includes fewer changes than an alternative set of changes that would represent deletion of all items in the original set of data and insertion of all items in the updated set of data.

3. The method of claim 1, wherein the technique to decrease how many move-type change notifications are in the change notification set comprises all of a patience sorting technique.

4. The method of claim 1, further comprising limiting access by the client to the updated set of data while generating the change notification set.

5. The method of claim 4, wherein limiting access comprises limiting access to such an extent that the change notification set can be sent to the client in series without the client being able to observe an inconsistent state of data in the data source.

6. The method of claim 5, further comprising allowing some access by the client to the updated set of data while generating the change notification set.

7. The method of claim 1, further comprising processing one or more requests from the client of the data source for data from the data source based on the original representation, the processing being performed while obtaining the updated representation.

8. The method of claim 7, wherein processing the one or more requests comprises adding one or more placeholders.

9. The method of claim 8, wherein processing the one or more requests further comprises performing a technique for matching the one or more placeholders with one or more items in the updated set of data.

10. The method of claim 1, wherein the original set of data and the updated set of data are versions of a subset of an overall set of data maintained by the data source, wherein the client of the data source maintain one or more handles to at least a portion of the subset of the overall set of data, the subset comprising less than all of the overall set of data maintained by the data source.

11. One or more computer-readable storage media having computer-executable instructions embodied thereon that, when executed by at least one processor, cause the at least one processor to perform acts comprising:
providing to a client of a data source an original representation of an original set of data in the data source;
receiving from the data source an updated representation of an updated set of data in the data source;
generating a change notification set comprising change notifications by comparing the updated representation with the original representation, the change notification set representing a possible set of changes that yield the updated representation when starting with the original representation, the possible set of changes including fewer changes than an alternative set of changes that would represent deletion of all items in the original set of data and insertion of all items in the updated set of data, generating the change notification set including executing a technique to decrease how many changes are in the possible set of changes, the technique to decrease how many changes are in the possible set of changes comprising identifying stationary items in the original set of data that are not to be identified as moved by the possible set of changes, the stationary items comprising a maximum set of ordered items in a range of items in the updated set of data that corresponds to a range of items in the original set of data; and sending the change notification set to the client.

12. The one or more computer-readable storage media of claim 11, wherein the acts further comprise limiting access by the client to the updated set of data while generating the change notification set, limiting access comprising limiting access to such an extent that the change notifications in the change notification set are sent to the client in series without allowing the client to observe an inconsistent state of data in the data source.

13. The one or more computer-readable storage media of claim 11, wherein the acts further comprise allowing some access by the client to the updated set of data while generating the change notification set.

14. The one or more computer-readable storage media of claim 11, wherein the acts further comprise processing one or more requests from the client of the data source, the one or more requests being one or more requests for data from the data source, the processing being performed while fetching the updated representation from the data source, and the processing comprising adding one or more placeholders.

15. The one or more computer-readable storage media of claim 11, wherein the possible set of changes includes one or more move-type change notifications that identify one or more items as moved.

16. The one or more computer-readable storage media of claim 11, wherein the acts further comprise:

detecting an update to the original set of data in the data source; and in response to detecting the update, requesting from the data source the updated representation of the updated set of data in the data source.

17. A computer system comprising:

at least one processor; and a memory comprising instructions stored thereon including an items manager component that when executed by the at least one processor causes the at least one processor to perform acts comprising:

providing to a client of a data source an original representation of an original set of data in the data source;

receiving from the data source an updated representation of an updated set of data in the data source;

generating a change notification set comprising change notifications by comparing the updated representation with the original representation, the change notification set representing a possible set of changes that yield the updated representation when starting with the original representation, the possible set of changes including fewer changes than an alternative set of changes that would represent deletion of all items in the original set of data and insertion of all items in the updated set of data, and the generation of the change notification set comprising identifying one or more stationary items in the original set of data that are not to be identified as moved by the possible set of changes, the one or more stationary items comprising a maximum ordered set of one or more items in a range of items in the updated set of data that corresponds to a range of items in the original set of data; and sending the change notification set to the client.

18. The computer system of claim 17, wherein the original set of data and the updated set of data are versions of a subset of an overall set of data maintained by the data source, wherein the client maintains one or more handles to the subset, the subset including less than all of the overall set of data maintained by the data source.

19. The computer system of claim 17, wherein the acts further comprise:

allowing some access by the client to the updated set of data while generating the change notification set; and limiting access by the client to the updated set of data while generating the change notification set, limiting access comprising limiting access to such an extent that the change notifications in the change notification set are sent to the client in series without allowing the client to observe an inconsistent state of data in the data source.

20. The computer system of claim 17, wherein the acts further comprise processing one or more requests from the client for data from the data source, the one or more requests being based on the original representation, the processing being performed while obtaining the updated representation of the updated set of data, and the processing comprising adding one or more placeholders and performing a technique for matching the one or more placeholders with one or more items in the updated set of data.

* * * * *